F. H. BANBURY.
MACHINE FOR TREATING RUBBER AND OTHER HEAVY PLASTIC MATERIALS.
APPLICATION FILED SEPT. 4, 1920.
1,370,398.
Patented Mar. 1, 1921.
3 SHEETS—SHEET 2.
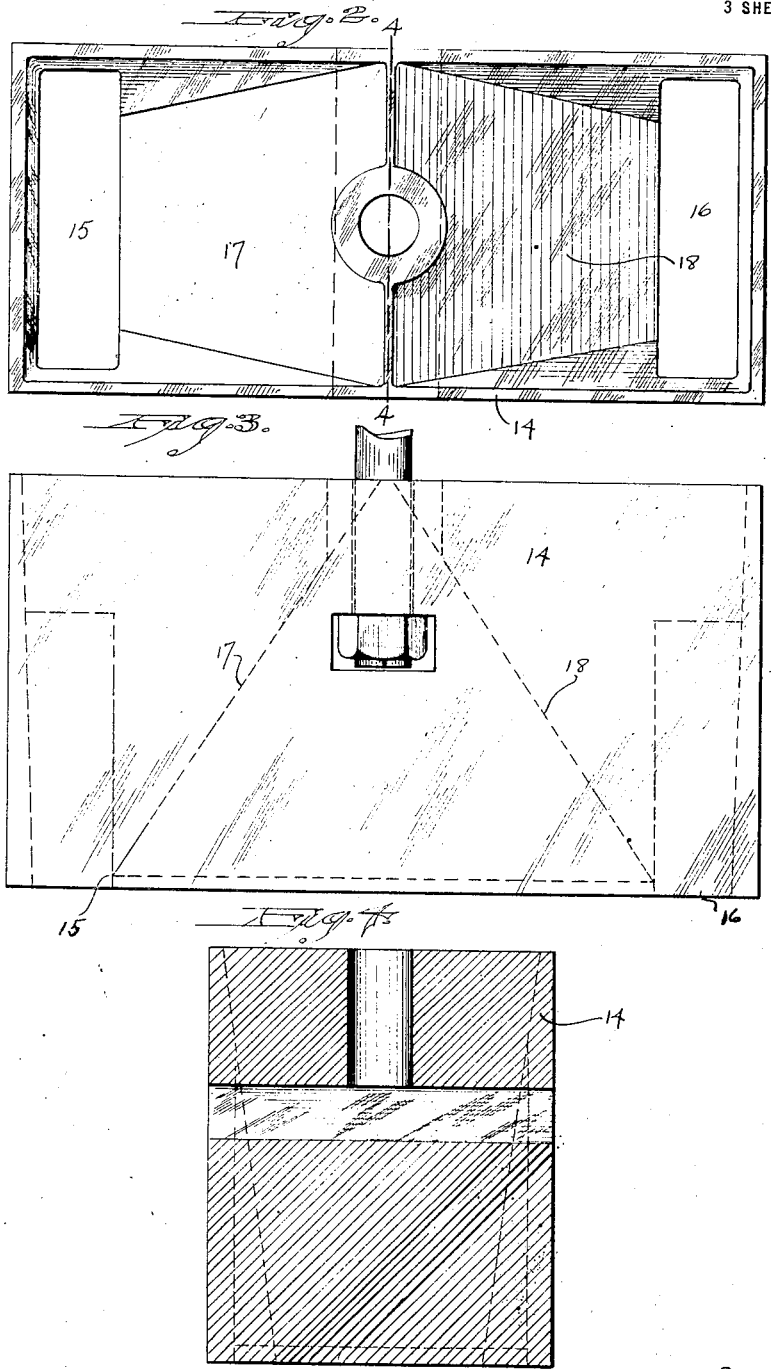

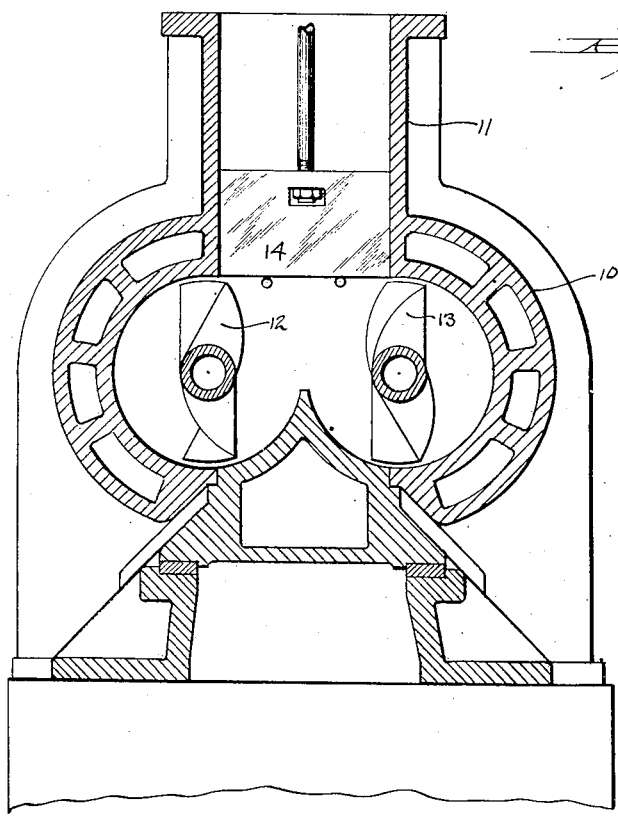

F. H. BANBURY.
MACHINE FOR TREATING RUBBER AND OTHER HEAVY PLASTIC MATERIALS.
APPLICATION FILED SEPT. 4, 1920.
1,370,398.
Patented Mar. 1, 1921.
3 SHEETS—SHEET 3.
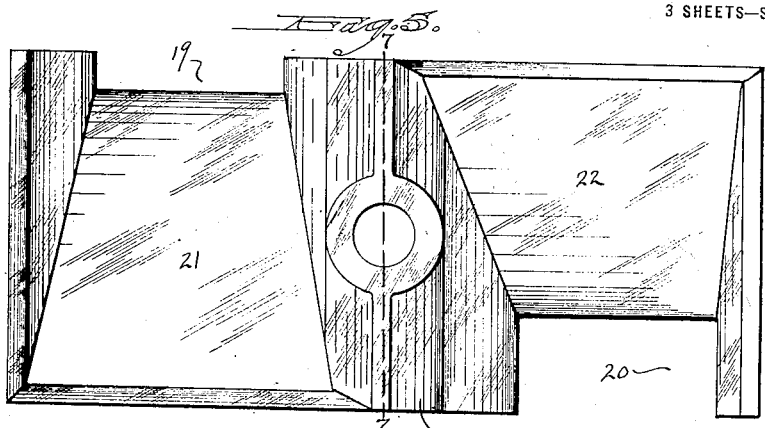
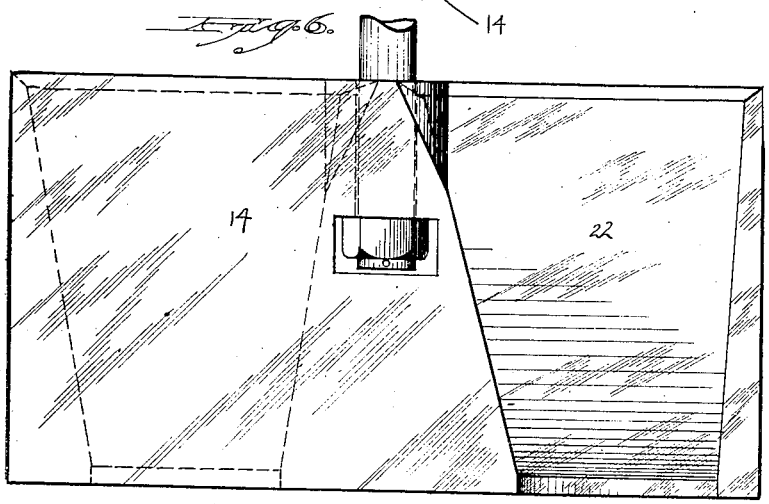
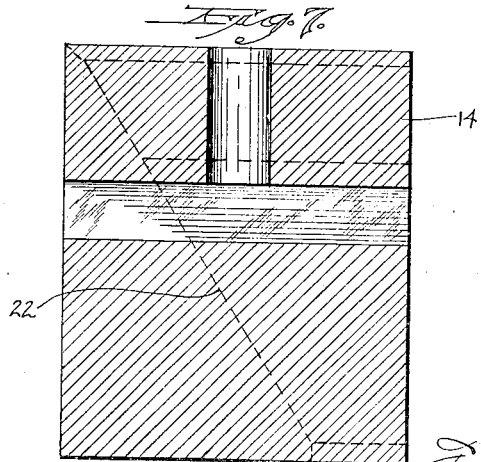

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIALS.

1,370,398.    Specification of Letters Patent.    Patented Mar. 1, 1921.

Application filed September 4, 1920. Serial No. 408,329.

*To all whom it may concern:*

Be it known that I, FERNLEY H. BANBURY, a subject of the King of Great Britain, residing at Ansonia, in the county of New Haven and State of Connecticut, have invented new and useful Improvements in Machines for Treating Rubber and other Heavy Plastic Materials; and I do hereby declare the following, when taken in connection with the accompanying drawings, and the characters of reference marked thereon, to be a full, clear, and exact description of the same, and which said drawings constitute part of this application, and represent, in—

Figure 1, a broken vertical sectional view illustrating a machine for treating rubber and other plastic material, provided with a weight embodying this invention.

Fig. 2, a top or plan view of the weight.

Fig. 3, a side view of the same.

Fig. 4, a sectional view on the line 4—4 of Fig. 2.

Fig. 5, a top or plan view of a modified form of weight.

Fig. 6, a side view of the same.

Fig. 7, a sectional view on the line 7—7 of Fig. 5.

This invention relates to an improvement in machines for treating rubber and other heavy plastic material, and particularly to the type of machine illustrated and described in United States Patent No. 1,200,070, October 3d, 1916, which includes a casing with rotors mounted therein, with a neck opening into the casing, and a vertically movable weight located in said neck. In treating plastic material in machines of the type herein referred to, and particularly in treating rubber, as the mass is worked by the rotors, powder is introduced from time to time as required. As the mass being worked becomes solid, the weight is moved up and down and at this time it is usually necessary to feed powder of one kind or another, according to the material being treated. Heretofore, it has been necessary to provide means for raising the weight so that powder could be introduced into the casing.

The object of this invention is to so construct the weight that powder or other material may be placed on top of the weight and by the up-and-down movement of the weight be fed into the casing; and the invention consists in the construction as hereinafter described and particularly recited in the claims.

In carrying out my invention, as herein shown, I employ a casing 10 provided with a neck 11 opening into the top of the casing, and rotors 12 and 13, and in the neck is a vertically movable weight 14. This weight is preferably formed at opposite ends with openings 15 and 16, the inner side-walls 17 and 18 of which are tapered from the center of the top of the weight downward forming two pockets into which powder or other material may be placed. As the weight is moved up and down by the mass of material operated upon by the rotors, the powder or other material supported by the weight will drop into the casing, it being understood that as a rule these powders will generally mass so as not to freely pass through the weight unless the weight is moved so as to dislodge portions of the powder at the bottoms of the openings.

Instead of forming the openings at each end, the weight may be formed on opposite sides with clearance channels 19 and 20 by cutting through the bottom of the weight, the walls 21 and 22 of the channels being tapered so that the channels are larger at the upper end than at the lower end, tending to cause the material placed therein to mass so that it will not be discharged except as the weight is moved up and down. As in the construction of the weight first described, powder or other material placed in the weight will mass in the channels and as the material being treated and moved by the rotors becomes solid, it will force the weight up and down and jar material placed in the weight into the casing to be operated upon by the rotors.

I claim:

1. In a machine of the class described, the combination with a casing provided with a neck, of a weight located in said neck, said weight formed with a clearance channel adapted to contain material to be delivered through the lower end of the weight.

2. In a machine of the class specified, the combination with a casing provided with a neck, of a vertically movable weight located in said neck, said weight formed at opposite ends with openings extending through the bottom of the said weight.

3. In a machine of the class specified, the combination with a casing provided with a neck, of a vertically movable weight within said neck, said weight formed at opposite ends with openings the inner walls of which are tapering.

In testimony whereof, I have signed this specification in the presence of two subscribing witnesses.

F. H. BANBURY.

Witnesses:
 FREDERIC C. EARLE,
 J. HAROLD FLYNN.